Figure 1:
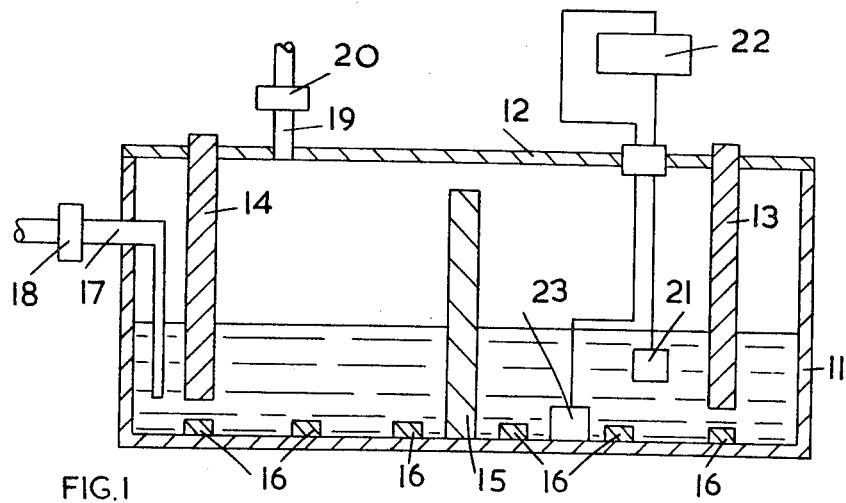

United States Patent [19]

Bashforth

[11] 4,119,506
[45] Oct. 10, 1978

[54] FUELS

[76] Inventor: George Charles Bashforth, La Mondine, Eureka Avenue, Coast Road, St. Clement, Jersey, Channel Islands, Channel Islands

[21] Appl. No.: 856,747

[22] Filed: Dec. 1, 1977

Related U.S. Application Data

[63] Continuation of Ser. No. 696,229, Jun. 15, 1976, abandoned, which is a continuation of Ser. No. 619,449, Oct. 3, 1975, abandoned, which is a continuation of Ser. No. 460,161, Apr. 11, 1974, abandoned.

[30] Foreign Application Priority Data

Apr. 12, 1973 [GB] United Kingdom ............... 17608/73

[51] Int. Cl.$^2$ ............................................... C25B 3/00
[52] U.S. Cl. ................... 204/72; 204/73 R; 204/131; 204/149; 204/DIG. 10
[58] Field of Search .................... 204/72, 77, 131, 149, 204/DIG. 10, 73 R

[56] References Cited

U.S. PATENT DOCUMENTS

| 687,386 | 11/1901 | Schwerin | 204/72 X |
|---|---|---|---|
| 695,573 | 3/1902 | Magnier et al. | 204/132 X |
| 966,025 | 8/1910 | Lautzenhiser et al. | 204/149 UX |
| 1,992,310 | 2/1935 | Hultman | 204/72 X |
| 2,303,210 | 11/1942 | Hales | 204/77 |
| 3,543,936 | 12/1970 | Abson et al. | 210/221 |
| 3,616,356 | 10/1971 | Roy | 204/152 |
| 3,625,884 | 12/1971 | Waltrip | 210/19 |
| 3,730,864 | 5/1973 | Tarjani et al. | 204/149 |
| 3,849,278 | 11/1974 | Sanders | 204/237 |

Primary Examiner—F.C. Edmundson

[57] ABSTRACT

An electrolysis process for producing a liquid hydrocarbon capable of being used as a fuel, in which the electrolyte is a liquid containing vegetable material, and the process parameters are selected so that the required liquid hydrocarbon is produced.

11 Claims, 3 Drawing Figures

FUELS

This is a Continuation of application Ser. No. 696,229, filed June 15, 1976, now abandoned, which is a continuation of application Ser. No. 619,499 filed Oct. 3, 1975, which is, in turn, a continuation of Ser. No. 460,161 filed Apr. 11, 1974, both abandoned.

This invention relates to the production of fuels, and in particular to a method of producing a liquid hydrocarbon capable of being used as a fuel in an internal combustion engine.

In a first aspect, the invention resides in the use of an electrolysis process to produce a liquid hydrocarbon capable of being used as a fuel, in which the electrolyte is a liquid containing vegetable material, and the process parameters are selected so that the required liquid hydrocarbon is produced.

In a second aspect, the invention resides in a process for producing a liquid hydrocarbon capable of being used as a fuel, comprising the steps of partly filling a container with an aqueous electrolyte containing vegetable material heating the electrolyte, and passing a current through the electrolyte in the presence of a source of carbon, the arrangement being such that the required liquid hydrocarbon is produced.

In a third aspect, the invention resides in a process for producing a liquid hydrocarbon capable of being used as a fuel, comprising the steps of partly filling a container with an aqueous electrolyte containing vegetable material, subjecting at least the vegetable material to pressure, heating the electrolyte, and passing a current through the electrolyte in the presence of a source of carbon, the arrangement being such that the required liquid hydrocarbon is produced.

Preferably, the vegetable material alone is subjected to pressure and is compressed prior to being introduced into said container.

Alternatively, the container is pressurised so as to subject the entire electrolyte to pressure. Conveniently, the container is pressurised to at least 4 p.s.i.

Preferably, the electrolyte is maintained at a temperature between 87° C. and 98° C.

Preferably, the source of carbon is a porous, carbon-containing member disposed approximately mid-way between the anode and cathode.

Preferably, aluminum is provided in the container between the anode and the cathode, and more preferably is provided at the base in the form of a series of evenly distributed strips.

The cathode is conveniently steel and the anode is ideally silver.

The vegetable material is preferably of the cruciferae family, including cauliflower and cabbage. Seaweed may also be used as the vegetable material.

The invention further resides in apparatus for performing the method described in the preceding paragraphs.

Figure 2:
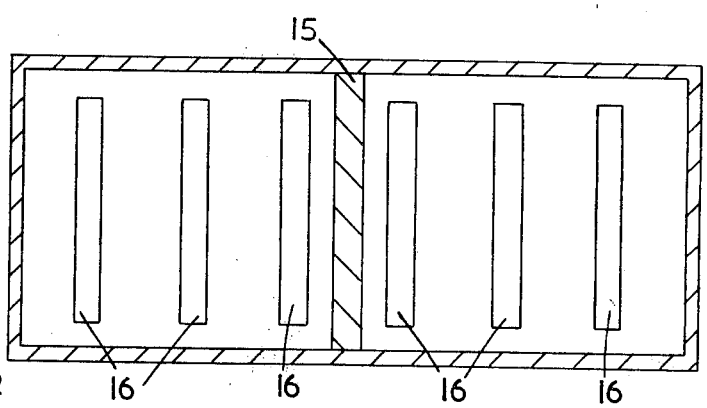
Figure 3:
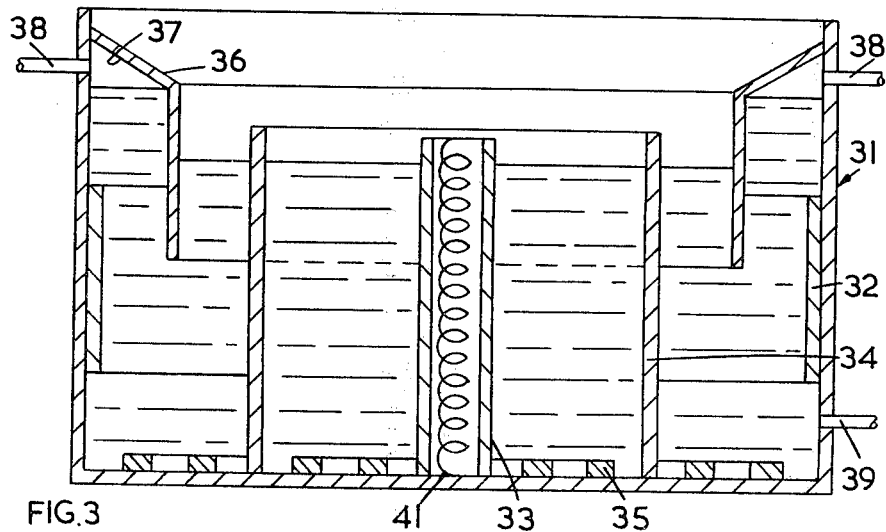

In the accompanying drawings,

FIG. 1 is a sectional side view illustrating diagramatically apparatus for performing a method according to a first example of the invention, FIG. 2 is a plan view of the apparatus shown in FIG. 1 with the lid of the container removed, and FIG. 3 is a sectional view illustrating diagramatically apparatus for performing a method according to a second example of the invention.

Referring to FIGS. 1 and 2, the apparatus shown therein includes a container 11 of rectangular configuration formed from an electrically insulating material and having a lid 12 which can be secured to the container in any convenient manner. Within the container are an anode 13 formed from pure silver, and a cathode 14 formed from mild steel. Conveniently, the anode 13 and cathode 14 are carried by the lid 12 as shown.

Extending parallel to the anode 13 and cathode 14, is a porous, carbon-containing member 15 which is in the form of an electrically insulating perforated container filled with charcoal. The member 15 is approximately equidistant from the anode 13 and cathode 14, and extends completely across the container 11. The member 15 must extend above the intended electrolyte level within the container 11, and preferably is as close as possible to the lid 12 without actually touching the lid 12.

On the base of the container 11 are a number of strips 16 formed from aluminium, which can be deposited on the base of the container 11. The aluminum strips are evenly distributed over the base of the container 11 and occupy an area between 5% and 10% of the total area of the base of the container 11.

Extending through one of the side walls of the container 11 is an outlet pipe 17 through which, in use, the liquid electrolysis products are removed and which contains a pressure relief valve 18. The pipe 17 is bent through 90° within the container, and terminates in the electrolyte. It is found to be desirable to locate the outlet pipe 17 adjcent the base of the container, especially where large quantities of electrolyte are being processed. Preferably the pipe 17 terminates within the first one tenth of the distance between the base and the lid 12. Moreover, extending from the lid 12 is a further outlet pipe 19 containing a second pressure relief valve 21. The valve 18 is set to open at 17 p.s.i., and the valve 21 is set to open at 24 p.s.i.

The tempoerature of the electrolyte is maintained within the range 87° C. to 98° C. For this reason, an electrically insulated heating element is provided within the electrolyte, together with an electrically insulated thermostat. The thermostat is indicated diagramatically at 21, and provides an input to a control circuit 22 which in turn provides power to an electrical heater 23 within the electrolyte. The leads to the thermostat 21 and heater 23 extend through the lid 12, and any convenient form of sealing arrangement is provided for this purpose.

In one practical embodiment using the apparatus described above, the electrolyte was cabbage which had been pulped and mixed with distilled water in proportions by weight of approximately 1 part cabbage to 9 parts water. The electrolyte thus formed was placed in the container 11, the total amount of electrolyte being not more than 50% of the volume of the container 11. The electrolyte was maintained at between 87° C. and 98° C., and the container was pressurised in any convenient manner to between 17 and 24 p.s.i. The electrodes were then connected to a d.c. source at 12 volts and a current of 8 to 12 amps was passed through the electrolyte. Using this arrangement, the process of electrolysis resulted in liquid flowing through the valve 18 as a result of the pressure above the electrolyte. Hydrogen was formed above the electrolyte, and tended to increase the pressure, but the valve 20 ensured that the pressure did not exceed 24 p.s.i. The minimum value of 17 p.s.i. was normally maintained by pressurising the container initially, and then relying upon the production of hydrogen to maintain the minimum level. However, if necessary an external source of pressure could have been constantly connected to the interior of the container. During the electrolysis process, it was found that the carbon of the member 15 and water from the electrolyte were consumed and, keeping the process parameters as described, the products of the process were as follows:

The first 40% by volume flowing through the valve 18 was a liquid hydrocarbon free from lead and capable of being used as a fuel in an internal combustion engine, and with a rating substantially in excess of 100 octane. The next 28% was a similar liquid with a rating between 87 and 92 octane. The next 12% was approximately equivalent to Kerosene, and the next 11% was approximately equivalent to gas or diesel oil. The other 9% remaining in the tank, was residue, but the residue was capable of being transferred to a settling tank, whereafter 5% of the residue was suitable for returning to the land as a fertiliser, and the remainder was suitable for mixing with a load to be used for a further process of electrolysis.

In the embodiment described above, the apparatus of the first example was used to produce a range of liquid hydrocarbon, but by controlling the pressure and temperature at specific values, the apparatus could have been arranged to produce specific hydrocarbons only.

Referring to FIG. 3 of the accompanying drawings, in the second example the apparatus includes a container 31 of hollow cylindrical configuration which is closed at one axial end and open at the other. The container is either formed from an electrically insulating material or is formed of conductive material provided with an internal electrically insulating lining. Positioned within the container 31 and located on, or supported adjacent to, the internal cylindrical wall of the container is a cylindrical anode 32 formed from pure silver, and conveniently in the form of silver foil. A tubular cathode 33 formed of stainless steel is supported on the base of the container so as to be co-axial therewith.

Extending co-axially with the cathode 33 is a porous, annular, carbon-containing member 34 which is in the form of an electrically insulating perforated container filled with charcoal and which is of such a diameter as to be located mid-way between the anode and the cathode. When the apparatus is used to produce a fuel, charcoal is consumed and means are provided for continuously supplying further charcoal to the perforated container so that the level of charcoal is maintained above the upper edge of the anode 32. Also, the perforated container is arranged to extend above the intended level of electrolyte within the container 31. On the base of the container 31 are a plurality of annular, evenly distributed aluminium strips 35, which are arranged co-axially with the anode 33. In one partical embodiment, in which the container 31 had a diameter of 4.5 feet, the spacing between adjacent strips was 3.5 inches.

Disposed adjacent the open end of the container 31, is an annular, electrically insulating baffle 36 which is supported by the internal wall of the container and depends therefrom so as to terminate inwardly from the anode 32, and at a height intermediate the ends of the anode. A space 37 is thereby defined between the baffle 36 and the internal wall of the container 31 and communicating with the space 37, are a plurality of outlet pipes 38, arranged around the circumference of the container 31 and positioned above the anode 32. Conveniently, the pipes 38 are connected to a common manifold (not shown). Located adjacent the base of the container 31 is an inlet pipe 39 through which, in use, electrolyte is introduced into the container, a further outlet pipe (not shown) conveniently being provided opposite the inlet pipe 39 so that the electrolyte can be continuously fed through the container.

As in the previous example, the temperature of the electrolyte is maintained in use within the range 87° C. to 98° C. For this reason, a heating element 41 and a thermostat (not shown) are provided to control the temperature of the electrolyte. In the example shown, the heating element and the thermostat are, for convenience, located within the tubular cathode 33, but it is to be appreciated that other arrangements can be employed.

When it is required to produce a fuel, vegetable matter, conveniently cabbage, is pulped, subjected to a pressure of about 30 p.s.i. and then mixed with distilled water, conveniently in proportions by weight of approximately one part vegetable matter to 9 parts water. The electrolyte thus formed is then introduced into the container 31 by way of the inlet pipe 39, although conveniently the electrolyte may be preheated before being introduced into the container. The container is filled with the electrolyte to a level such that the free end of the baffle 36 is immersed in the electrolyte, but part of the space 37 is free of electrolyte. When the electrolyte is at the required level and, with the temperature of the electrolyte being maintained within the required range of between 87° C. and 98° C., the anode 32 and cathode 33, are connected to a d.c. source (not shown) which conveniently produces a pulsating current at a frequency of 40–100 c.p.s. In one practical embodiment, in which the container 31 had a diameter of 4.5 feet, the source was used to pass through the electrolyte a current of 5 amp at 12 volts. Using the above arrangement, an electrolysis process proceeds within the container 31 and results in fuel being collected in the space 37 above the electrolyte. The fuel is removed by way of the outlet pipes and, provided the fuel is removed continuously, it is found that the fuel has a substantially constant rating in excess of 100 octane. If, however, the fuel collecting in the space 37 is only removed periodically, it is found that the first portion removed has a high octane rating, whilst subsequent portions have a lower octane rating.

In the examples described above, the aluminium strips 16, 35 have been distributed evenly throughout the container and this has been found to be important since a single sheet of aluminium occupying the same area as the strips does not give satisfactory results.

It is to be appreciated that, although in the above examples cabbage has been used since it is readily available, satisfactory results can be obtained with other vegetation of the cruciferae family.

I claim:

1. An electrolysis process for producing a liquid hydrocarbon capable of being used as a fuel, comprising the steps of partly filling a container with an aqueous electrolyte containing vegetable material selected from the group consisting of seaweed and a member of the cruciferae family, said container having a pair of spaced electrodes therein and carbon disposed between said electrodes, heating the electrolyte and passing a current from one electrode to the other through the electrolyte whereby the desired liquid hydrocarbon is produced, and recovering the liquid hydrocarbon.

2. An electrolysis process as claimed in claim 1 wherein aluminum is provided in the container between the electrodes.

3. An electrolysis process as claimed in claim 2 wherein said aluminum is provided at the base of the container on the form of a series of evenly distributed strips.

4. An electrolysis process as claimed in claim 1 wherein the electrolyte is maintained at a temperature between 87° C. and 98° C.

5. An electrolysis process as claimed in claim 1 wherein carbon is a porous carbon containing member disposed approximately mid-way between the electrodes.

6. An electrolysis process as claimed in claim 1 wherein the said member of the cruciferae family is selected from cauliflower and cabbage.

7. An electrolysis process for producing a liquid hydrocarbon capable of being used as a fuel comprising the steps of partly filling a container with an aqueous electrolyte containing vegetable material selected from the group consisting of seaweed and a member of the cruciferae family, said container having a pair of spaced electrodes therein and carbon disposed between the electrodes, subjecting the electrolyte to a pressure greater than atmospheric pressure, heating the electrolyte and passing a current from one electrode to the other through the electrolyte whereby the desired liquid hydrocarbon is produced, and recovering the liquid hydrocarbon.

8. An electrolysis process as claimed in claim 2 wherein the vegetable material is compressed prior to being introduced into said container.

9. An electrolysis process as claimed in claim 7 wherein the container is pressurized by at least 4 p.s.i.

10. An electrolysis process for producing a liquid hydrocarbon capable of being used as a fuel, comprising the steps of partly filling a container with an aqueous electrolyte containing a vegetable material selected from the group consisting of seaweed and a member of the cruciferae family, said container having therein a silver anode and a steel cathode spaced from said anode and carbon disposed between said anode and said cathode, heating the electrolyte, and passing a current between the anode and the cathode through the heated electrolyte to produce a liquid hydrocarbon, and recovering the liquid hydrocarbon.

11. An electrolysis process for producing a liquid hydrocarbon capable of being used as a fuel, comprising the steps of providing a plurality of evenly distributed strips of aluminum at the base of a container, partly filling the container with an aqueous electrolyte containing a vegetable material selected from the group consisting of seaweed and a member of the cruciferae family, said container having therein a silver anode and a steel cathode spaced from said anode and carbon disposed between said anode and said cathode, heating the electrolyte, and passing a current between the anode and the cathode through the heated electrolyte to produce a liquid hydrocarbon, and recovering the liquid hydrocarbon.

* * * * *